2,861,101
Patented Nov. 18, 1958

2,861,101

LINEAR POLYSULFONIC ACID POLYMERS

William F. Tousignant and Thomas Houtman, Jr., Midland, Mich., assignors to The Dow Chemical Company, Midland, Mich., a corporation of Delaware No Drawing. Application April 13, 1956
Serial No. 577,916

13 Claims. (Cl. 260—513)

This invention has reference to novel polysulfonic salts and acids and to a method for their preparation. More particularly, it relates to linear polysulfonic salt and acid polymers from polyepichlorohydrins.

It is the primary purpose of the present invention to provide polysulfonic salt and acid polymeric materials from polyepichlorohydrins that are in general conformance with a compound having the folowing structural representation:

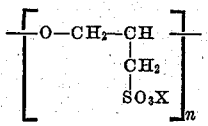

wherein $n$ is a plural integer, and X is selected from the group consisting of a hydrogen atom and a salt forming ion. The salt forming ion advantageously may be from an alkali metal.

According to the invention, polysulfonate salt polymers of the above-identified type may be prepared by reacting polyepichlorohydrin with an alkali metal sulfite salt in the proportion of at least about one mole of the alkali metal sulfite salt for each mole of substituent chlorine atom which is present in the polyepichlorohydrin to form the polysulfonate salt polymer which, advantageously, may be employed as an intermediate to obtain the free acid form by converting the polysulfonate salt polymer to a polysulfonic acid polymeric material. It may frequently be beneficial, when higher molecular weight polyepichlorohydrins are involved, to employ a quantity of the alkali metal sulfite salt which is in excess of stoichiometric requirements. Ordinarily, it is desirable to employ the alkali metal sulfite salt in a saturated aqueous solution for the reaction.

The polysulfonic acid polymeric materials that are provided by the present invention are generally water soluble, amber colored, viscous, strongly acid liquid substances. Their molecular weights, as is apparent, are usually dependent upon the molecular weight of the starting polyepichlorohydrin that is employed. It is generally advantageous for the polysulfonic acid polymer that is prepared to have a molecular weight of at least about 500 and, for many purposes, substantially higher molecular weights may be even more desirable. Among various applications, the polysulfonic acid polymers of the invention have particular utility as dispersing agents for such types of materials as clays and certain pigments and as dye assistants or dye receptors for textile materials. In some instances it may be advantageous to provide the polysulfonic acids in a form in which they are substantially free from salt that may be formed in sulfonating the polyepichlorohydrin or subsequently acidifying the polysulfonate intermediate, or both.

The polyepichlorohydrins which are employed as starting materials in the preparation of the polysulfonic acid polymers of the invention may be prepared conveniently by polymerizing epichlorohydrin using propylene glycol as an initiator. The alkali metal sulfite salt which is utilized may be the conventional (neutral) sulfite or the (acid) bisulfite salt. It is usually satisfactory to employ the sodium or potassium sulfite salts in the practice of the invention. Although it is not usually necessary to provide a special vehicle for conducting the reaction, it is, as mentioned, advantageous and desirable to employ the alkali metal sulfite salt in a saturated aqueous solution.

The reaction may usually be accomplished at a temperature between about 100 and 250° C., although in many instances it may be advantageous to employ a reaction temperature in the range from about 150° C. to about 200° C. It is generally beneficial to conduct the reaction under a superatmospheric pressure in order to facilitate the achievement of a desirable reaction temperature. Often, a pressure up to about 200 pounds per square inch gauge may be advantageous. Frequently, pressures between about 50 and 100 pounds per square inch gauge may be employed more suitably. The reaction may ordinarily be terminated with complete conversion of the substituent chlorine atoms in the starting polyepichlorohydrin to sulfonate groups within a period of about 24 hours. Many times, however, a complete conversion may be achieved in periods of time as short as 4 hours or less.

The polysulfonic acid polymer may be obtained readily by acidifying the polysulfonate salt which is obtained after conversion of the polyepichlorohydrin. It is ordinarily desirable to employ a hydrohalic acid such as hydrochloric acid for this purpose. Polysulfonic acid polymers which are substantially free from salt can ordinarily be obtained by performing the acidification with a concentrated and, preferably, a saturated hydrohalic acid and separating the polysulfonic acid polymer therefrom.

The invention is further illustrated in and by the following examples in which, unless otherwise indicated, all parts and percentages are to be taken by weight:

EXAMPLE 1

About 375 parts of a polyepichlorohydrin having an average molecular weight of about 500 was placed in an autoclave with about 378 parts of sodium sulfite which was dissolved in about 2100 parts of water to provide a saturated solution of the salt. The autoclave was adapted to be operated under pressure and was equipped with an efficient stirring mechanism. The charged ingredients were mixed in the autoclave and heated to a temperature of about 150° C. under a pressure between 60–70 pounds per square inch gauge. These conditions were maintained for a period of about 6 hours during which time all of the substituent chlorine atoms in the polyepichlorohydrin material were converted to substituent sodium sulfonate groups. The reacted intermediate sulfonate material in aqueous solution was then evaporated to near dryness. It was subsequently placed, as a viscous water and sodium chloride-containing mass, in a glass vessel which was equipped with a stirrer and sparger. About 1,000 parts of concentrated hydrochloric acid having a specific gravity of about 1.18 was then added to the mass. After addition of the hydrochloric acid, stirring was commenced and anhydrous hydrogen chloride was sparged into the mass while it was being maintained at a temperature of about 35° C. At this point the polysulfonic acid polymer formed and dissolved free from the sodium chloride which was substantially insoluble in the concentrated acid solution. The polysulfonic acid solution was then filtered through sintered glass and the hydrogen chloride removed from the solution by vacuum extraction. Water was removed from the polymeric product by a conventional vacuum drying technique at a temperature of about 40° C. under a pressure of about 25 millimeters of mercury. The polysulfonic acid polymer, which was obtained in a form substantially free from salt, was a water soluble, amber colored viscous liquid. When the acid was converted to the sodium salt upon addition of sodium carbonate and the polysulfonate analyzed for its sulfur content, it was found to contain between about 16.72 and 16.84 percent sulfur which indicated that all of the chlorine atoms in the polyepichlorohydrin were actually replaced by the sodium sulfonate group in the reaction.

Minor quantities of the polysulfonic acid polymer were found to be capable of dispersing clay and titanium dioxide in an aqueous medium and to retain good dispersions for periods in excess of 4 days. In addition, when about 7 percent of the polysulfonic acid polymer was applied to a textile fiber comprised of polyacrylonitrile, it was found to enhance the dye receptivity of the fiber, particularly with acetate, vat and basic dyestuffs.

EXAMPLE 2

Several runs in which the foregoing procedure was substantially repeated were performed while employing different polyepichlorohydrin starting materials, changed ratios of ingredients and altered reaction conditions. In all cases, polysulfonic acid products similar to that obtained in the first example were obtained after converting the polysulfonate material which was initially prepared. The polysulfonic acid products, similar to that obtained in Example 1, had good properties as dispersing agents for clay and titanium dioxide and were useful dye assistants for polyacrylonitrile fibers. The pertinent data and the results of each of the runs are presented in the following tabulations. In Table 2 there is included several of the physical properties of the free polysulfonic acid product from runs "F," "G" and "H" as obtained from a 50 percent by weight aqueous solution of the acid material.

Table 1.—*Preparation of polysulfonate polymer intermediate for conversion to polysulfonic acid polymers*

| Run | "B" | "C" | "D" | "E" |
|---|---|---|---|---|
| Molecular Weight of Polyepichlorohydrin | 500 | 500 | 1,130 | 1,545 |
| Parts of Polyepichlorohydrin employed | 250.6 | 375.0 | 520.0 | 386.0 |
| Parts Sodium Sulfite employed | 252.1 | 378.0 | 693.0 | 504.0 |
| Parts Water Employed | 1,400 | 2,100 | 3,855 | 2,800 |
| Temperature of Reaction, ° C | 200 | 150 | 160–180 | 166–175 |
| Time of Reaction, hours | 3 | 6 | 24 | 24 |
| Pressure of Reaction, p. s. i. g | 180 | 59–68 | 75–98 | 75–110 |
| Percentage Conversion of Chloride Substituents in Polyepichlorohydrin | 100 | 100 | 100 | 100 |

Table 2.—*Preparation of polysulfonate polymer intermediate for conversion to polysulfonic acid polymers including physical properties of free polysulfonic acid products therefrom in 50 percent by weight aqueous solution*

| Run | "F" | "G" | "H" |
|---|---|---|---|
| Molecular Weight of Polyepichlorohydrin | 500 | 1,130 | 1,545 |
| Amount of Polyepichlorohydrin Employed, Lbs | 3.75 | 3.25 | 3.86 |
| Amount of Sodium Sulfite Employed, Lbs | 3.78 | 4.34 | 5.04 |
| Amount of Water Employed, Lbs | 21.0 | 43.37 | 28.0 |
| Temperature of Reaction, ° C | 150 | 167 | 168 |
| Time of Reaction, Hrs | 8 | 32 | 24 |
| Pressure of Reaction, p. s. i. g | 57 | 114 | 103 |
| Conversion of Chloride Substituents in Polyepichlorohydrin | Complete | About 90 Percent | Complete |
| Acidity of 50 Percent Aq. Polysulfonic Acid Solution Expressed in Milliliters of 1 N NaOH Required For Neutralizing 1 gram of Solution | 2.94 | 3.18 | 2.59 |
| pH of 50 Percent Aq. Polysulfonic Acid Solution | Less than 1 | Less than 1 | Less than 1 |
| Absolute Viscosity of 50 percent Aq. Polysulfonic Acid Solution at 25° C. in Centipoises | 8.87 | 1.38 | 2.20 |
| Absolute Viscosity of 50 Percent Aq. Polysulfonic Acid Solution at 75° C. in Centipoises | 2.88 | 0.46 | 0.68 |
| Density of 50 Percent Aq. Polysulfonic Acid Solution at 25°/4° C | 1.236 | 1.271 | 1.285 |
| Density of 50 Percent Aq. Polysulfonic Acid Solution At 75°/4° C | 1.209 | 1.243 | 1.258 |
| Refractive Index of 50 Percent Aq. Polysulfonic Acid Solution at 25° C | 1.4108 | 1.4159 | 1.4173 |
| Percentage by weight of Ash of 50 Percent Aq. Polysulfonic Acid Solution | 0.57 | 1.65 | 5.70 |
| American Public Health Association Color of 50 Percent Aq. Polysulfonic Acid Solution | 400 | 450 | 200 |
| Flash Point of 50 Percent Aq. Polysulfonic Acid Solution (Cleveland Open Cup Method) | None | None | None |

Similar excellent results may be obtained when substantially higher molecular weight polyepichlorohydrins are employed as starting materials and when their initial conversion is effected with sodium bisulfite.

What is claimed is:

1. A polymeric material having the general formula:

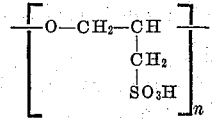

wherein $n$ is a plural integer, and X is selected from the group consisting of a hydrogen atom and a salt forming ion.

2. The polymeric material set forth and claimed in the first claim wherein X is an ion from an alkali metal.

3. The polymeric material set forth and claimed in the first claim wherein X is a hydrogen atom.

4. A polysulfonic acid polymeric material in accordance with the polymeric material set forth and claimed in the first claim having a molecular weight of at least about 500.

5. Method for the preparation of a polysulfonate salt polymeric material having the general formula:

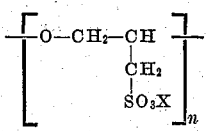

wherein $n$ is a plural integer and X is an ion from an alkali metal, which comprises reacting a polyepichlorohydrin with an alkali metal sulfite salt in the proportion of at least about one mole of the alkali metal sulfite salt for each mole of substituent chlorine atom which is present in the polyepichlorohydrin to form a polysulfonate salt polymer.

6. Method for the preparation of a polysulfonic acid polymeric material having the general formula:

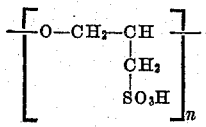

wherein $n$ is a plural integer, which comprises reacting a polyepichlorohydrin with an alkali metal sulfite salt in the proportion of at least about one mole of the alkali metal sulfite salt for each mole of substituent chlorine atom which is present in the polyepichlorohydrin to form an intermediate polysulfonate polymer, and converting the polysulfonate polymer to a polysulfonic acid polymeric material.

7. In the method of claim 6, employing the alkali metal sulfite salt in aqueous solution.

8. The method of claim 6, wherein the alkali metal sulfite salt is sodium sulfite.

9. The method of claim 6, wherein the alkali metal sulfite salt is sodium bisulfite.

10. In the method of claim 6, reacting the polyepichlorohydrin and the alkali metal sulfite salt at a temperature between about 100 and 250° C.

11. In the method of claim 6, reacting the polyepichlorohydrin and the alkali metal sulfite salt at a temperature between about 150 and 200° C.

12. In the method of claim 6, employing the alkali metal sulfite salt in aqueous solution and reacting the polyepichlorohydrin therewith under a superatmospheric pressure up to about 200 pounds per square inch gauge.

13. In the method of claim 6, converting the intermediate polysulfonate polymer to a polysulfonic acid polymeric material by acidification with a hydrohalic acid.

References Cited in the file of this patent
FOREIGN PATENTS 857,893   France _____ Apr. 29, 1940

OTHER REFERENCES

Epichlorohydrin: Technical Booklet, SC: 49–35 (Shell Chemical Corp.), 1949, pp. 10, 11 and 34.